UNITED STATES PATENT OFFICE.

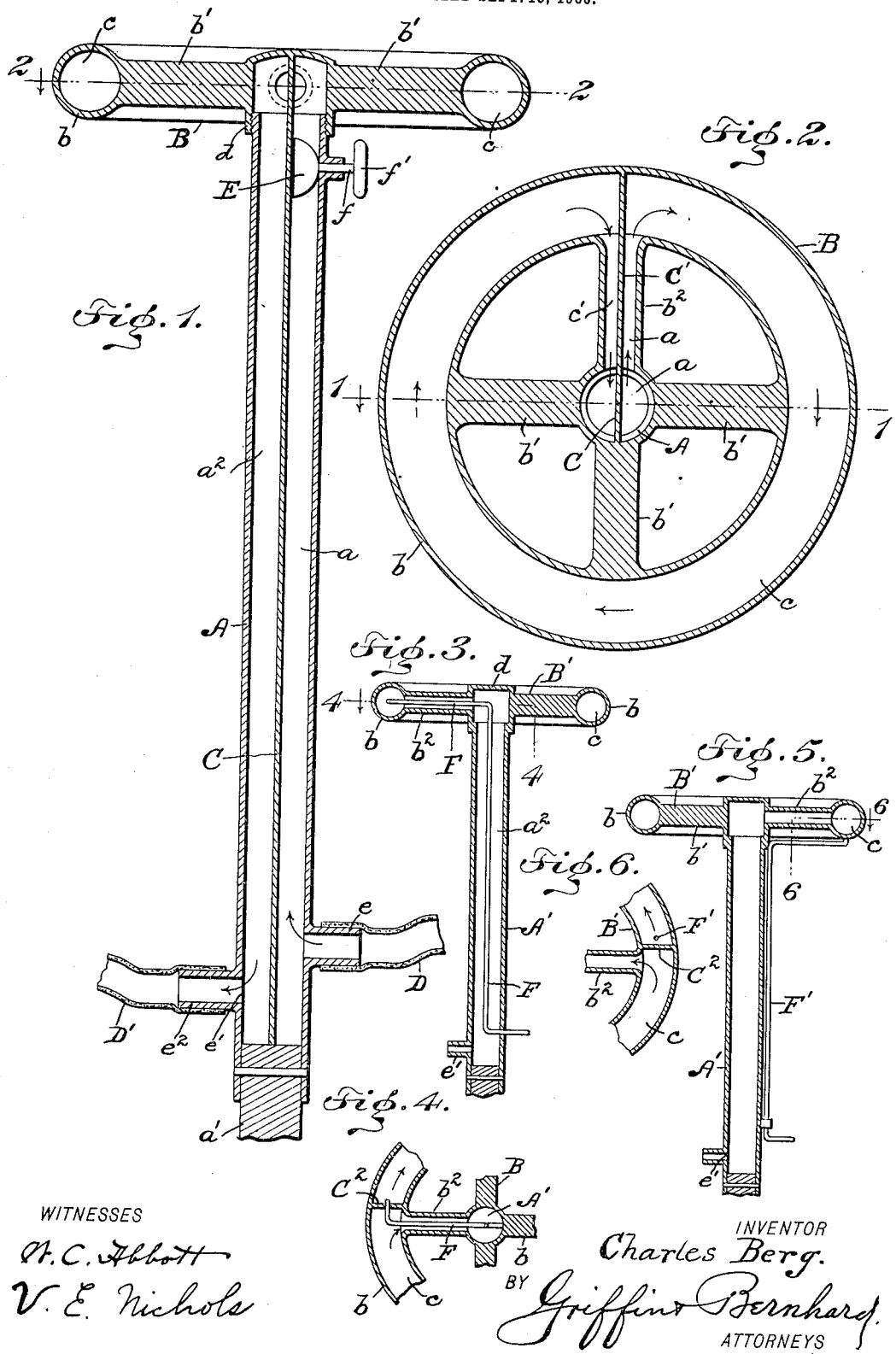

CHARLES BERG, OF NEW YORK, N. Y.

STEERING MECHANISM.

No. 851,394.     Specification of Letters Patent.     Patented April 23, 1907.

Application filed September 10, 1906. Serial No. 333,894.

*To all whom it may concern:*

Be it known that I, CHARLES BERG, a citizen of the United States, residing at the city of New York, borough of Brooklyn, in the county of Kings and State of New York, have invented a certain new and useful Steering Mechanism, of which the following is a specification.

This invention is a steering mechanism for automobiles, motor cycles, and any or all kinds of vehicles or craft intended to be driven by motors.

The object of the invention is to provide means for heating that part or member of a steering mechanism, such as the steering wheel, by the exhaust from the motor, thus increasing the comfort of the steersman or chauffeur in cold weather and overcoming liability to lose control of the vehicle or craft by numbness of the hands.

A further object of the invention is to provide a new form of construction whereby the exhaust motive fluid is conducted away from the heatable member of the steering mechanism in such a manner as to avoid obstructing the view, or exposing the occupants of the vehicle or craft to the offensive vapor; and, at the same time, the necessary connections are made for supplying the motive fluid to, or conveying the same from, the steering post without interfering in any way with the free rotation or manipulation thereof.

Broadly stated, the invention consists of a chambered or hollow steering member, such as a hand wheel, and means whereby the exhaust motive fluid from a motor is caused to circulate to and through said member for the purpose of heating the latter.

More specifically stated, the invention resides in a hollow steering post, a steering wheel having a hollow rim and a hollow spoke so constructed that the heating medium is caused to circulate through the spoke and the rim, and passages for conveying the heating medium to and from the spoke.

I have illustrated a practical embodiment of the invention in the accompanying drawings, in which Figure 1 is a vertical section through a part of a steering mechanism, constructed in accordance with this invention, the plane of the section being indicated by the dotted line 1—1 of Fig. 2, looking in the direction of the arrow; Fig. 2 is a horizontal section on the line 2—2 of Fig. 1; Fig. 3 is a vertical section, partly in elevation, illustrating another embodiment of the invention; Fig. 4 is a horizontal section on the line 4—4 of Fig. 3, showing certain parts in plan; Fig. 5 is a vertical section of another embodiment of the invention; and Fig. 6 is a horizontal section on the line 6—6 of Fig. 5.

In the construction shown by Figs. 1 and 2, A designates a steering post adapted to be mounted in any suitable way known to the art. As shown, the post is hollow, being, preferably, tubular. B designates that part of the steering mechanism which is intended to be grasped and manipulated by hand. As shown, this member B is a steering wheel, but it will be understood that various other forms of steering members may be substituted for the wheel. The wheel consists of a rim $b$, a series of spokes $b'$, and a hollow spoke $b^2$, (see Fig. 2) which represents the wheel as being cast in one piece. As shown, the rim $b$, of the steering wheel is hollow or chambered, in order to produce an annular chamber $c$, for the circulation of a heating medium into and through the wheel, and with this chamber $c$ communicates the passage $c'$, of the hollow spoke $b^2$, whereby said passage $c'$, connects the chamber $c$ of the rim with the vertical passage $a$, of the hollow steering post A. The wheel B is provided with a hub $d$, the latter being hollow, and said hub is attached to the upper part of the steering post in any suitable way or preferred manner, whereby the wheel B is mounted on the post for the purpose of turning the latter on its axis. The hollow hub $d$ of the steering wheel has communication with the passage $a$ of the steering post, and with the passage $c'$ of the hollow spoke $b^2$. C designates a partition or division wall extending longitudinally through the hollow steering post A. This division wall terminates at the plug $a'$, which closes the lower part of the hollow post, said division wall extending entirely through said hollow post, and upwardly into the hollow hub $d$ of the steering wheel. The upper part of the division wall is extended or prolonged horizontally through the hollow spoke $b^2$, and transversely across the chamber of the rim $b$, as indicated at C' in Fig. 2. It will be noted that the division wall or partition C, C', extends practically the full length of the steering post, and through the hollow spokes $b^2$, and across the chamber of the hollow rim, whereby the partition or division wall serves to divide the hollow parts A, $b^2$, and $b$, into passages or ducts for the circulation of the heating medium. One of said passages serves for the inlet feed or supply of the heating medium, and it is indicated at $a$, whereas the other passage $a^2$, conveys the heating medium away from the chambered rim of the steering wheel. The post A is provided at or near its lower part with a nipple $e$, which communicates with the passage $a$ of said post, and to this nipple is adapted to be attached a feed pipe D, the latter being preferably of a flexible nature. Said feed pipe may be a flexible tube or hose, or a flexible metallic tube, and said pipe is connected with the exhaust of a motor or engine. The nipple $e$ is on one side of the steering post A, and on the other side of said post is an outlet port $e'$, the latter being preferably below the nipple $e$, for the purpose of discharging the heating medium from the tubular post. As shown by Fig. 1, the outlet port $e'$ may be surrounded by a nipple $e^2$, to which may be connected a hose or pipe D', but the nipple $e^2$, and the pipe D', may be dispensed with, if desired.

The operation is evident from the foregoing description. The exhaust fluid from an explosive engine, a steam engine, or other appropriate form of motor, is conveyed by the pipe D to the nipple $e$, and passes through the passage $a$ of the post A, the hub $d$, and the spoke $b^2$, from whence the fluid passes into the chamber $c$ of the rim $b$. The fluid circulates through or around the rim, as indicated by the arrows in Fig. 2, and it thence passes through the passage $c'$, of the spoke $b^2$, the passage $a^2$, and the post A, the fluid being discharged through the port $e'$, or through the hose D'. It will be seen that the heating medium circulates through the post, the chambered rim of the steering wheel, and back through the post so as to be discharged at a point below the floor of the vehicle.

For the purpose of controlling the circulation of the heating medium through the steering wheel, I have shown the post A as being equipped with a damper or valve E, the latter being located, preferably, at the upper part of said post, and below the steering wheel B. It is evident that any suitable form of regulating valve may be employed, but, for the purposes of illustration only, the said valve is shown by Fig. 1 as an ordinary damper arranged in the passage $a$. The damper is mounted on a spindle $f$, having an exposed head or operating piece $f'$. The damper is shown by Fig. 1 in an open position, to permit the heating medium to pass readily from the steering post into the hollow rim $b$, but it is evident that the damper may be turned across the passage $a$, for the purpose of cutting off admission of said heating medium to the steering wheel.

In Figs. 3 and 4 of the drawings, I have represented another embodiment of the invention, wherein a separate feed pipe is employed for conveying the heating medium directly to the chambered rim of the steering wheel. The post A' is hollow and provided at its lower part with an outlet port or nipple $e'$. The steering wheel B' has a hollow or chambered rim $b$, and a hollow spoke $b^2$. The chamber $c$, of the hollow rim is provided with a transverse partition $C^2$, located at one side of the hollow spoke $b^2$. The separate feed pipe F passes into the lower part of the hollow post A', thence extends lengthwise through said post to the hub $d$, of said wheel, and thence extends through the hollow spoke $b^2$, the extremity of said pipe F being extended through the partition $C^2$. It will be understood that the pipe F conveys the heating medium through the post and the hollow spoke, for the purpose of discharging said heating medium into the chamber $c$ of the steering wheel rim. The heating medium circulates through or around said rim and is discharged through the hollow spoke $b^2$, and the steering post A', the heating medium being free to escape through the outlet $e'$.

In the construction just described in connection with Figs. 3 and 4, the separate feed pipe F extends longitudinally through, and is encased within, the hollow post A', and the hollow spoke $b^2$. In Figs. 5 and 6 of the drawings, however, I have shown a somewhat different arrangement of the feed pipe, the latter being located externally to the post and the steering wheel. In said construction of Figs. 5 and 6, the hollow steering post A', and the steering wheel B', are employed substantially as in the construction of Figs. 3 and 4, but the independent feed pipe F' is mounted in any suitable way externally of the post A', and below the steering wheel B', the upper extremity of said pipe F opening into the chamber $c$ of the hollow rim $d$, at a point located on one side of the division wall $C^2$, as clearly shown. Any suitable means may be employed for holding the external pipe F in position to turn with the steering post and the steering wheel, and the heating medium is supplied directly to the chamber $c$ of the rim, so as to circulate through said chamber, for the purpose of heating said rim. The fluid is discharged from the steering wheel through the hollow spoke $b^2$, and the post A', from whence said heating medium finds an outlet through the exit port $e'$.

Having thus described my invention, what I claim as new, and desire to secure by Letters Patent, is:—

1. In a device of the class described, a steering wheel having a chambered rim, a division wall in said rim, means for supplying a heating medium to the rim at one side of the division wall, there being an eduction passage leading from the rim.

2. In a device of the class described, a hollow post, a wheel having a chambered rim and also provided with a hollow spoke, the latter connecting the post and the rim, and means for dividing the chambers of the rim and the post.

3. In a device of the class described, a hollow post, a chambered wheel having a hollow spoke, and a division wall extending across the post, the spoke and the wheel.

4. In a device of the class described, a hollow post, a steering wheel provided with a hollow rim, said wheel being carried on said post for the chamber of the hollow rim to communicate with a passage of said hollow post, and a division wall across the chamber of said hollow rim, whereby a heating medium is supplied to the rim, caused to circulate around and within the steering wheel, and exhausted through the hollow post.

5. In a device of the class described, a steering wheel provided with a hollow rim, a division wall in a chamber formed by said rim, means for supplying a heating medium to said chamber on one side of the division wall therein, and means at the other side of the division wall for conducting a heating medium from said rim.

6. In a device of the class described, a steering wheel provided with a chambered interiorly divided rim, means for conveying a heating medium to said rim, and means for carrying off a heating medium to the rim, whereby a heating medium is caused to circulate through and around said rim.

7. In a device of the class described, a steering wheel provided with a chambered interiorly divided rim and with a plurality of spokes, one of said spokes being hollow, a post on which the wheel is mounted, means for supplying a heating medium to said rim, and means for carrying off a heating medium from said rim.

In testimony whereof I have signed my name to this specification in the presence of two subscribing witnesses:

CHARLES BERG.

Witnesses:
H. I. BERNHARD,
V. E. NICHOLS.